US010161025B2

(12) United States Patent
Poole et al.

(10) Patent No.: US 10,161,025 B2
(45) Date of Patent: Dec. 25, 2018

(54) METHODS FOR CONSTRUCTING PARTS WITH IMPROVED PROPERTIES USING METALLIC GLASS ALLOYS

(71) Applicant: Apple Inc., Cupertino, CA (US)

(72) Inventors: Joseph C. Poole, San Francisco, CA (US); Theodore A. Waniuk, Lake Forest, CA (US); Jeffrey L. Mattlin, San Francisco, CA (US); Michael S. Nashner, San Jose, CA (US); Christopher D. Prest, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 342 days.

(21) Appl. No.: 14/690,239

(22) Filed: Apr. 17, 2015

(65) Prior Publication Data

US 2015/0315678 A1   Nov. 5, 2015

Related U.S. Application Data

(60) Provisional application No. 61/986,794, filed on Apr. 30, 2014.

(51) Int. Cl.
   *C22C 1/00*  (2006.01)
   *C22C 45/00*  (2006.01)
   (Continued)

(52) U.S. Cl.
   CPC ............... *C22C 45/00* (2013.01); *B05D 5/00* (2013.01); *B22F 3/1055* (2013.01); *B22F 3/11* (2013.01);
   (Continued)

(58) Field of Classification Search
   None
   See application file for complete search history.

(56) References Cited

U.S. PATENT DOCUMENTS 4,386,896 A  6/1983 Ray
5,288,344 A  2/1994 Peker et al.
(Continued)

FOREIGN PATENT DOCUMENTS

JP  2001-303218  10/2001
JP  2009-173964  5/2009
JP  2014-058716  4/2014

OTHER PUBLICATIONS

Hays, C.C. et al., "Microstructure Controlled Shear Band Pattern Formation and Enhanced Plasticity of Bulk Metallic Glasses Containing in situ Formed Ductile Phase Dendrite Dispersions", Physical Review Letters, vol. 84, No. 13, Mar. 27, 2000, pp. 2901-2904.*
(Continued)

*Primary Examiner* — George Wyszomierski
(74) *Attorney, Agent, or Firm* — Polsinelli PC

(57) ABSTRACT

Described herein are methods of constructing a part having improved properties using metallic glass alloys, layer by layer. In accordance with certain aspects, a layer of metallic glass-forming powder is deposited to selected positions and then fused to a surface layer (i.e. layer below) by suitable methods such as laser heating or electron beam heating. The deposition and fusing are then repeated as need to construct the part, layer by layer. In certain embodiments, one or more sections or layers of non-metallic glass-forming material can be included as needed to form a composite final part. In certain aspects, the metallic glass-forming powder may be crystalized during depositing and fusing, or may be recrystallized during subsequent processing to provide selectively crystalized sections or layers, e.g., to impart desired functionality. In other aspects, non-metallic glass-forming materials may be deposited and fused at selected positions, e.g., to provide selective shear banding to impart improved ductile properties and plasticity. In yet other aspects, the metallic glass-forming powder or metallic glass material and
(Continued)

non-metallic glass-forming material are deposited and fused to form a foam-like, bellow or similar structure, which is able to crumple under high stress to absorb energy under impact.

16 Claims, 8 Drawing Sheets

(51) Int. Cl.
    *B05D 5/00*        (2006.01)
    *B22F 3/105*      (2006.01)
    *B22F 3/11*        (2006.01)
    *B22F 9/08*        (2006.01)
    *C22C 33/02*      (2006.01)
    *C22C 47/14*      (2006.01)
    *C22C 49/14*      (2006.01)

(52) U.S. Cl.
    CPC .............. *B22F 3/1115* (2013.01); *C22C 1/00* (2013.01); *C22C 1/002* (2013.01); *B22F 9/08* (2013.01); *C22C 33/0214* (2013.01); *C22C 33/0278* (2013.01); *C22C 47/14* (2013.01); *C22C 49/14* (2013.01); *C22C 2200/02* (2013.01); *Y02P 10/295* (2015.11)

(56) References Cited

U.S. PATENT DOCUMENTS

| | | | |
|---|---|---|---|
| 5,368,659 | A | 11/1994 | Peker et al. |
| 5,576,884 | A | 11/1996 | Ise et al. |
| 5,618,359 | A | 4/1997 | Lin et al. |
| 5,647,921 | A | 7/1997 | Odagawa et al. |
| 5,711,363 | A | 1/1998 | Scruggs et al. |
| 5,735,975 | A | 4/1998 | Lin et al. |
| 6,086,651 | A | 7/2000 | Mizushima |
| 6,325,868 | B1 | 12/2001 | Kim et al. |
| 6,749,700 | B2 | 6/2004 | Sunakawa et al. |
| 7,575,040 | B2 | 8/2009 | Johnson |
| 2001/0028245 | A1 | 10/2001 | Li et al. |
| 2004/0046481 | A1 | 3/2004 | Takeuchi et al. |
| 2006/0157164 | A1 | 7/2006 | Johnson et al. |
| 2006/0254386 | A1 | 11/2006 | Inoue et al. |
| 2007/0003782 | A1* | 1/2007 | Collier ................... B22D 25/00 428/621 |
| 2007/0079907 | A1 | 4/2007 | Johnson et al. |
| 2007/0111119 | A1* | 5/2007 | Hu ..................... B23K 26/0884 430/57.8 |
| 2007/0267111 | A1 | 11/2007 | Fleury et al. |
| 2007/0290339 | A1* | 12/2007 | Suh ......................... C22C 45/10 257/737 |
| 2008/0118387 | A1 | 5/2008 | Demetriou et al. |
| 2008/0155839 | A1* | 7/2008 | Anderson ................ B25G 1/10 30/350 |
| 2008/0185188 | A1 | 8/2008 | Blue et al. |
| 2008/0209976 | A1* | 9/2008 | Deneuville ............... B21C 3/00 72/372 |
| 2009/0139858 | A1 | 6/2009 | Nakamura et al. |
| 2009/0246549 | A1* | 10/2009 | Jang ......................... C22C 1/002 428/550 |
| 2010/0084052 | A1 | 4/2010 | Farmer et al. |
| 2010/0300148 | A1 | 12/2010 | Demetriou et al. |
| 2010/0310901 | A1* | 12/2010 | Makino .................. C22C 33/003 428/800 |
| 2011/0025171 | A1 | 2/2011 | Goto et al. |
| 2011/0165339 | A1* | 7/2011 | Skoglund .............. B22F 3/1055 427/532 |
| 2012/0174976 | A1 | 7/2012 | Kim et al. |
| 2012/0247948 | A1 | 10/2012 | Shin et al. |
| 2012/0312061 | A1 | 12/2012 | Pham et al. |
| 2012/0325051 | A1 | 12/2012 | Watson |
| 2013/0139964 | A1* | 6/2013 | Hofmann .................. G02B 5/08 156/330 |
| 2013/0309121 | A1 | 11/2013 | Prest et al. |
| 2014/0007983 | A1* | 1/2014 | Prest .................. B22D 19/0081 148/403 |
| 2014/0334106 | A1 | 11/2014 | Prest et al. |
| 2015/0202841 | A1 | 7/2015 | Verreault et al. |
| 2015/0267286 | A1 | 9/2015 | Na et al. |
| 2015/0299825 | A1 | 10/2015 | Poole et al. |
| 2015/0314566 | A1 | 11/2015 | Poole et al. |
| 2015/0315687 | A1 | 11/2015 | Poole et al. |
| 2016/0024630 | A1 | 1/2016 | Weber et al. |

OTHER PUBLICATIONS

Shen et al., "Bulk Glassy $Co_{43}Fe_{20}Ta_{5.5}B_{31.5}$ Alloy with High Glass-Forming Ability and Good Soft Magnetic Properties," *Materials Transactions*, vol. 42, No. 10 (2001) pp. 2136-2139.

Inoue et al., "Bulk Amorphous Alloys with High Mechanical Strength and Good Soft Magnetic Properties in Pe-TM-B (TM=IV-VII Group Transition Metal) System," *Appl. Phys. Lett.*, vol. 71, (1997) pp. 464.

Conner et al., "Mechanical Properties of Tungsten and Steel Fiber Reinforced $Zr_{41.25}Ti_{13.75}Cu_{12.5}Ni_{10}Be_{22.5}$ Metallic Glass Matrix Composites," *Acta mater.*, 1998, vol. 46, No. 7, pp. 6089-6102.

Kato et al., "Relationship between thermal expansion coefficient and glass transition temperature in metallic glasses," *Scripta Materialia*, 2008, vol. 58, pp. 1106-1109.

Shackelford, James R. Alexander, William CRC Materials Science and Engineering Handbook, (2001), Taylor & Francis, (3rd Edition), Table 112.

* cited by examiner

METHODS FOR CONSTRUCTING PARTS WITH IMPROVED PROPERTIES USING METALLIC GLASS ALLOYS

CROSS-REFERENCE TO RELATED APPLICATION

The present application claims the benefit of U.S. Provisional Patent Application No. 61/986,794, entitled "Methods for Constructing Three-Dimensional Parts with Improved Properties Using Metallic Glass Alloys," filed on Apr. 30, 2014, which is incorporated herein by reference in its entirety.

FIELD

The present disclosure is directed to methods of constructing parts using metallic glass alloys.

BACKGROUND

Metallic glasses have been made in a variety of metallic systems. They are generally prepared by quenching from above the melting temperature to the ambient temperature. Generally, high cooling rates such as one on the order of $10^5$° C./sec to $10^3$° C./sec, are needed to achieve an amorphous structure. The lowest rate by which a metallic glass can be cooled to avoid crystallization, thereby achieving and maintaining the amorphous structure during cooling, is referred to as the critical cooling rate for the BMG. In order to achieve a cooling rate higher than the critical cooling rate, heat has to be extracted from the sample. The thickness of articles made from amorphous alloys often becomes a limiting dimension, which is generally referred to as the critical (casting) thickness.

There exists a need for methods of constructing parts using metallic glasses, as well as a need for metallic glass-forming materials designed for use in such methods.

SUMMARY

Described herein are methods of constructing a part having improved properties using metallic glass alloys, layer by layer, as well as structures produced by such methods. The disclosure is also directed to methods of improving properties of metallic glass parts.

In accordance with certain aspects, a layer of a metallic glass-forming alloy is deposited to selected positions and then fused to a surface layer by suitable methods such as laser heating or electron beam heating. The metallic glass-forming alloy can comprise a powder, wire, sheets, or any other suitable form that can be depositing in a layer by layer method. The deposition and fusing are then repeated as need to construct the part, layer by layer. The surface layer can be a metallic glass layer.

The methods described herein can be used to make various metallic glass containing parts or devices, including amorphous metallic glass parts including foam-like or bellow structures.

In one aspect, the disclosure is direct to a metallic glass part with selective crystalline portions or non-metallic glass regions that has improved toughness over a substantially amorphous metallic glass part. In some embodiments, the composite metallic glass part with selective crystallization can have toughness can be at least 5% greater than a substantially monolithic metallic glass part.

In one aspect a method of forming the metallic glass part with an amorphous portion and a crystalline portion is provided. A layer of a metallic glass-forming alloy, at least a portion of which is an amorphous powder, is deposited. At least a portion of the metallic glass-forming alloy is heated to a temperature above the glass transition temperature of the metallic powder and cooled to form the metallic glass part with an amorphous portion and a crystalline portion.

In certain aspects, the metallic glass-forming powder may contain a crystalline portion. In other aspects, the metallic glass-forming alloy may be crystalized during depositing and fusing, or may be recrystallized during subsequent processing to provide selectively crystalized sections or layers, e.g., to impart desired functionality.

In other aspects, materials that do not form metallic glasses may be deposited and fused at selected positions, e.g., to provide selective shear banding to impart improved ductile properties and plasticity in a metallic glass composite part.

In certain embodiments, one or more sections or layers of materials that do not form metallic glasses can be included as needed to form a composite final part. For instance, sections or layers of non-amorphous material, crystalline material, Kevlar fiber, non-heated metallic glass-forming powder, can be included to form composite parts.

In yet other aspects, the metallic glass-forming alloys are deposited and fused to form a foam-like, bellow or similar structure, which is able to crumple under high stress to absorb energy under impact. In one aspect, a layer of a metallic glass-forming alloy is deposited and heated to create the foam. In some embodiments, the alloy can be deposited to form a lattice pattern. In some embodiments, the structure of the lattice can be an organized or ordered patterned. The metallic glass foam be incorporated into or integrally formed in the housing to create an region with improved energy absorption (i.e. a crumple zone) from impact. In some embodiments, the metallic glass foam can comprise internal structures in the housing. In other embodiments, the metallic glass foam can be an internal core of the housing that is surrounded by a solid shell.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
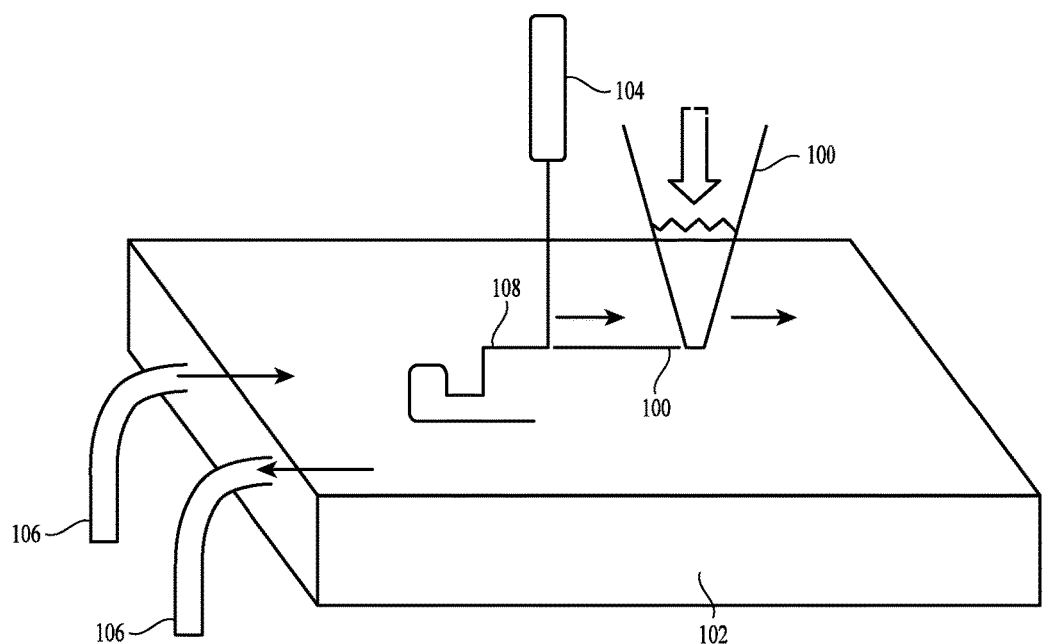
FIG. 1 depicts an exemplary method of constructing a part from metallic glass-forming alloy layer by layer.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Metallic glass-forming alloys, bulk-solidifying amorphous alloys, amorphous alloys, or bulk metallic glasses ("BMG"), are a class of metallic materials. These alloys may be solidified and cooled at relatively slow rates, and they retain the amorphous, non-crystalline (i.e., glassy) state at room temperature. Amorphous alloys (also referred to as metallic glasses) have many superior properties compared to their crystalline counterparts. However, if the cooling rate is not sufficiently high, crystals may form inside the alloy during cooling, so that the benefits of the amorphous state can be lost. For example, one challenge with the fabrication of bulk amorphous alloy parts is partial crystallization of the parts due to either slow cooling or impurities in the raw alloy material. As a high degree of amorphicity (and, conversely, a low degree of crystallinity) is desirable in metallic glass parts, there is a need to develop methods for fabricating metallic glass parts that have a controlled amount of amorphicity.

Metallic glass structures that can be prepared by printing and layer depositions are disclosed herein. In various aspects, layer deposition can be accomplished in certain ways as follows.

In accordance with the present disclosure, methods of constructing a part using metallic glass alloys, layer by layer (i.e. printing or layer deposition) are provided. In certain aspects, a layer of metallic glass-forming alloys (such as a powder, wire, or sheet) or metallic glass material is deposited to selected positions, and then fused to a surface layer by suitable methods such as laser heating or electron beam heating. Specific regions can be heated by techniques such as selective laser melting (SLM). The deposition and fusing are then repeated as need to construct the part, layer by layer. In certain aspects, methods and final parts are improved by providing metallic glass-forming powders or sheets of metallic glass material and optional material that metallic glass, with desired properties.

The metallic glass-forming alloy and metallic glass materials may comprise a metallic glass alloy, a mixture of the alloy's constituent elements, or precursors of metallic glass alloys, as described in further detail herein.

In certain embodiments, a homogenous atomized metallic glass-forming alloy is provided. In certain aspects, such alloys may provide improved glass-forming ability and repeatability of quality of final parts. Metallic glass-forming (i.e. amorphous alloys) are sensitive to compositional variations, with changes as little as 0.1 wt % affecting the glass-forming ability (GFA) of an alloy. For instance, metallic glass-forming alloys are generally composed of at least three, four, or more, different elements, which sometimes have very different densities, creating potential issues with solubility and compositional homogeneity.

To address these potential issues, in certain aspects, the metallic glass-forming alloy is a homogenous atomized powder. For instance, a metallic glass-forming alloy may be gas atomized during cooling to form an atomized powder, and the atomized powder may be mixed in any suitable manner known in the art, e.g., mechanical mixing, to provide a homogenous atomized metallic glass-forming powder. In certain aspects, homogenous atomized metallic glass-forming powders are useful in the methods described herein to provide repeatability of quality of final parts, as compared to final parts prepared using metallic glass-forming powder with homogeneous properties formed from sectioning and remelting alloy ingots.

In an atomization process, the cooling rate which each element of an alloy sees is very high due to the small particle size and large surface area for thermal heat transfer. Atomizing gases may also be subject to rapid expansion through nozzles, causing them to be at low temperature (e.g., below 0° C.) when impinging on the alloy, which will further increase the cooling rates. Due to this high cooling rate, an alloy that is atomized is very likely to be highly amorphous (high viscosity is reached before crystal are able to nucleate and grow).

FIG. 1 depicts an exemplary method of constructing a metallic glass part using a moving platen, and outlet that deposits metallic glass powder on the platen, and a heat source. In other embodiments, the platen can be stationary. According to an embodiment as shown in FIG. 1, a metallic glass-forming alloy 100 can be deposited to selected positions on a platen 102 and heated (e.g., within 0.1 second, 0.5 second, 1 second or 5 seconds from the time the powder contacts a layer below) by a suitable heater 104 (e.g. a laser or electron beam) so as to fuse the powder to a layer below (i.e. a surface layer, which can be a metallic glass layer). Alternative heating methods can include induction and infrared heating. The powder is heated to a temperature above its melting temperature. The platen 102 can be cooled, for example, by cooling lines 106, through which a cooling fluid such as water or a gas can be flowed. Alternatively, the platen can be cooled by thermoelectric cooling methods. The platen 102 can reduce the thermal exposure of particles previously layered, thereby reducing the likelihood that such particles can be converted to crystalline form during formation of additional layers. The resulting metallic glass-forming powder can be fused to form fused metallic glass 108. As will be understood by those of skill in the art, the initial and final layers of material may or may not be processed in the same manner.

Numerous variations of the device are possible. For example, as will be understood by those of skill in the art, the initial and final layers of material may or may not be processed in the same manner. Further, a wire or sheet may be used instead of a powder. The platen may move or be stationary, or components dispensing the metallic glass can move or be stationary. Alternatively, the platen surface can be covered with the metallic glass-forming alloy, and the alloy can be heated (e.g. by a laser or electron beam) at the positions at which a metallic glass is to be created.

In various embodiments, the platen can be temperature regulated. In some embodiments, the platen as described in various embodiments herein can be cooled, for example, by cooling lines, through which a cooling fluid such as water or a gas can be flowed. Alternatively, the platen can be cooled by thermoelectric cooling methods. In other embodiments, the platen can be a passive heat sink. Alternatively, the platen can be heated. Without wishing to be limited to any mechanism or mode of action, the platen can be heated to reduce or avoid increase of internal stress within the metallic glass on formation.

The metallic glass-forming powder can be deposited from any suitable outlet, such as a nozzle. In one embodiment, the powder can be deposited from a plurality of outlets, movement of each of which can be independently or collectively controlled. The heater can be any suitable heater such as a laser, electron beam, ultrasonic sound wave, infrared light, etc. The powder can be deposited onto the selected positions by moving the outlet, moving the platen or both so that the outlet is positioned at the selected positions relative to the platen. Flow of the powder from the outlet can be controlled by a shutter or valve. The movement of the outlet and/or platen, and the shutter or valve can be controlled by a computer. A part of a desired shape can be constructed by depositing and fusing the powder layer by layer. According to an embodiment, the fused powder can be smoothed by a suitable method, such as polishing and grinding, before the next layer of powder is deposited thereon. In various configurations, the powder can be dispensed with two or more nozzles. In further configuration and alternative to layering, a nozzle can dispense individual granules of crystalline material to create a matrix composite.

Without intending to be limited by theory, metallic glass materials may be sensitive to oxygen content. For instance, oxides within an alloy may promote nucleation of crystals thereby detracting from formation of an amorphous microstructure. Some amorphous alloy compositions form persistent oxide layers, which may interfere with the fusion of particles. Further, surface oxides may also be incorporated into the bulk alloy and may degrade the glass-forming ability of the alloy.

Figure 2A:
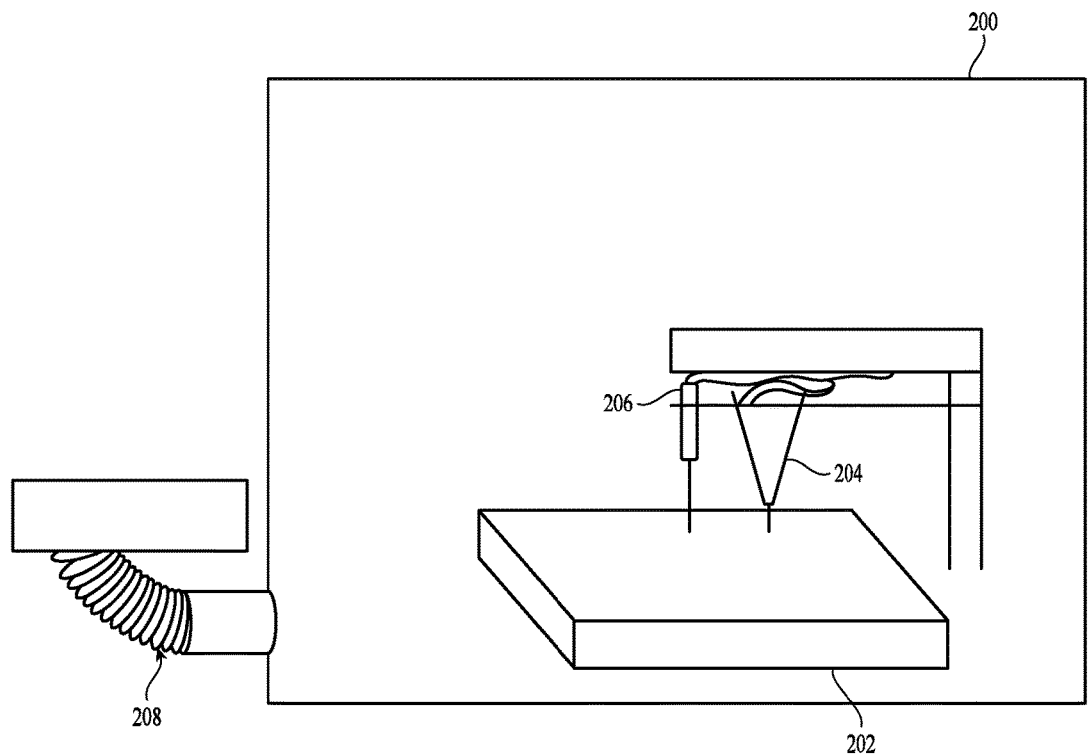
FIG. 2A depicts an exemplary enclosure for providing a vacuum, inert or reducing atmosphere.
Figure 2B:
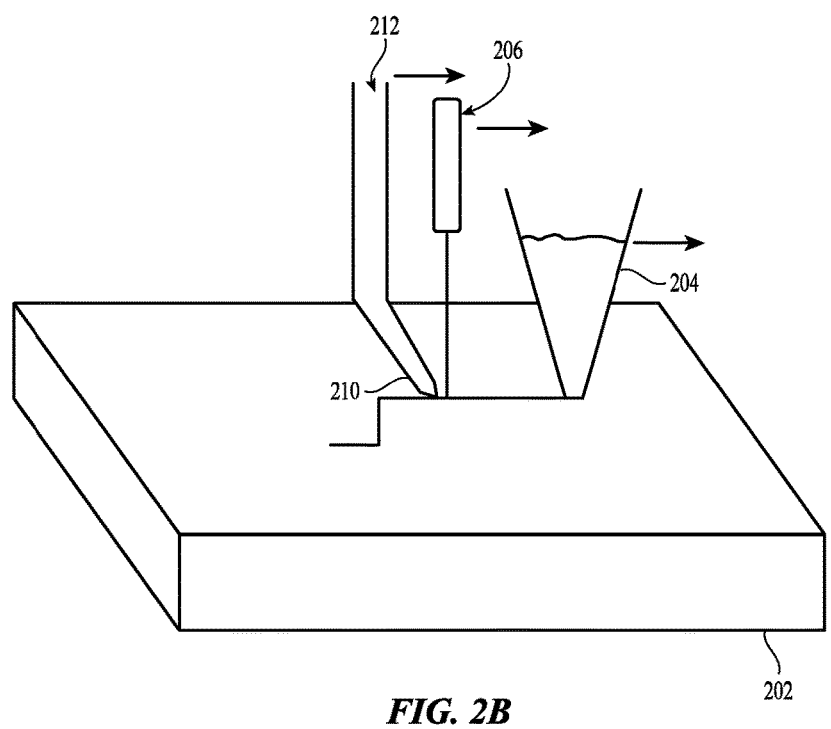
FIG. 2B depicts an exemplary scheme to locally provide an inert or reducing atmosphere.

As such, in certain embodiments, it may be desirable to protect the as-deposited powder (or sheets of metallic glass material, not shown) in an inert atmosphere, a reducing atmosphere or in vacuum while the powder is being heated, to remove oxygen from particle interfaces and from the final part. As shown in FIG. 2A, the platen 202, the outlet 204 and the heater 206 can be in an enclosure 200 placed under a vacuum (e.g., 1-10 mTorr) by evacuation pump 208, a reducing atmosphere (e.g., hydrogen or a mixture of hydrogen and nitrogen), or an inert atmosphere (e.g., argon, nitrogen, or other inert gases). The enclosure can be pumped by an evacuation pump. Alternatively, as shown in FIG. 2B, in a non-enclosed system, inert gas 212 can be locally flowed to the powder (or alternatively sheets of metallic glass material, not shown) being heated by the heater.

The platen can be cooled by any suitable method such as flowing liquid or gas therethrough, e.g., water cooling, gas cooling, or thermal electric cooling. The platen can be cooled at a sufficiently high rate to ensure that the fused powder is maintained as fully amorphous (or its desired amorphous state). As discussed herein, amorphous metals can be crystallized by high temperature/time exposures. In this regard, a layer may have an amorphous microstructure when first melted following deposition and heating according to a method described herein. However, without controlled cooling, previous layers of amorphous metal may be transformed to a crystalline microstructure during deposition and heating of subsequent layers due to heat conduction.

The selective heating methods described herein can be used to form specific metallic glass structures. These structures can have mechanical properties, including increased hardness, over conventional materials known in the art.

In accordance with certain embodiments, composite parts may be formed by depositing one or more layers of materials that do not form metallic glasses. For instance, one or more layers of material that is not metallic glass (e.g., non-heated metallic glass-forming powder, non-amorphous materials, crystalline material, Kevlar fibers, plastic, ceramic or other insulators, other metals or semi-conductors) can be similarly deposited and fused on to a layer of amorphous metal below.

Figure 3:
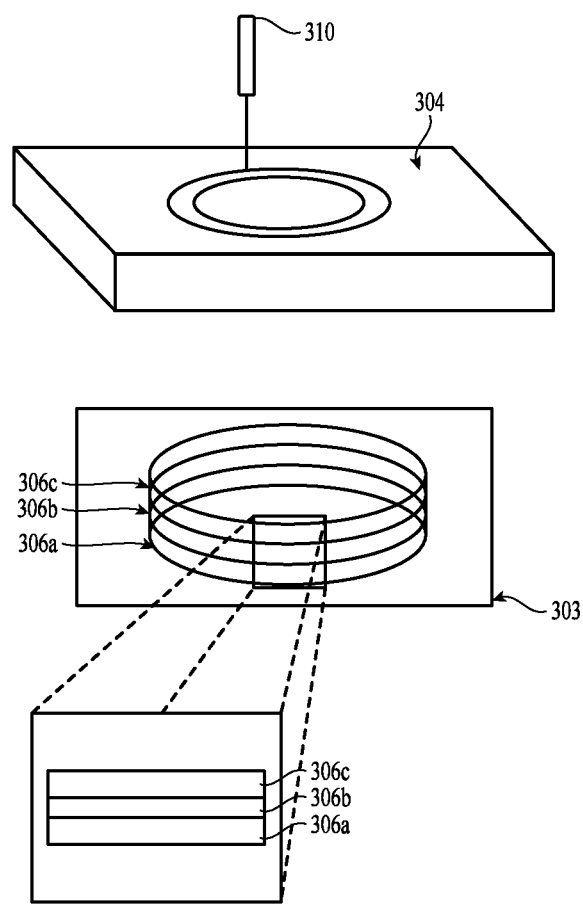
FIG. 3 depicts an exemplary method of constructing a part from metallic glass sheets layer by layer.

FIG. 3 shows an exemplary part made from metallic glass and non-metallic glass powder or sheets layer by layer. Metallic glass feedstock 304 is cut using laser cutting tool 310. This cutting is repeated for each layer 306a, 306b, and 306c. Stacked layers can be fused by applying heat and/or pressure using any suitable method such as hot pressing, laser irradiation, electron beam irradiation, or induction heating while the stacked layers 306a and 306b are on platen 302. Though three layers are depicted in FIG. 3, any number of layers can be fused using the described method. Although FIG. 3 depicts the layers are having distinct boundaries at an interface between adjacent layers, such does not have to be the case. In some embodiments, if the layers may be fused at the interface between each adjacent layer. In other embodiments, if there may be some diffusion between the layers at an interface between adjacent layers.

Figure 4:
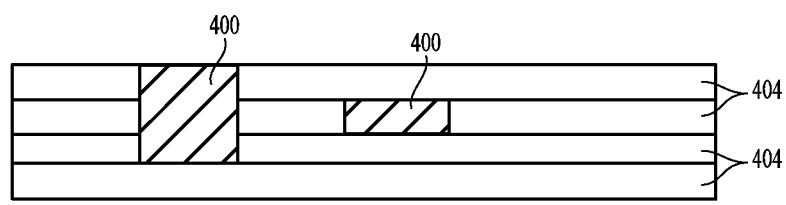
FIG. 4 depicts an exemplary composite part made from metallic glass-forming alloy and non-metallic glass-forming material layer by layer.

In an alternative embodiment as shown in FIG. 4, a plurality of layers of metallic glass material can be cut by a suitable method such as laser or die cutting, from one or more layers of metallic glass material 404 formed from the metallic glass-forming powder described herein. The layers of metallic glass correspond to cross-sections of a part to be made. Alternatively, thin sheets can be extruded directly from a melt or created by melt spinning instead of using a powder. The plurality of layers of metallic glass and optionally one or more layers of non-metallic glass layers 400 (e.g., non-heated metallic glass-forming powder, non-amorphous materials, crystalline material, Kevlar fibers, plastic, ceramic or other insulators, other metals or semi-conductors) can then be stacked in desired spatial relations among the layers onto a platen and fused to form the part with desired functionality. In some embodiments, a non-metallic glass material that is in a granulated form can be added selectively added to the layers of metallic glass to form a matrix with of non-metallic glass interspersed between regions of metallic glass.

For instance, in certain aspects, a metallic glass part may be constructed with selective crystallization, e.g., to impart desired functionality. As described herein, the microstructure of a metallic glass part depends, in part, on the thermal processing history of the metallic alloy material. In accordance with certain embodiments of the disclosure, the metallic glass-forming alloy may be crystalized during depositing and fusing, or may be recrystallized during subsequent processing to provide selectively crystalized sections or layers, e.g., to impart desired functionality. In some embodiments, to create crystalized regions during deposition and fusing, the metallic glass-forming alloy may be selectively heated to different temperatures and cooled at different rates. By way of example, without intending to be limiting, in some embodiments, a portion of the deposited metallic glass-forming alloy can be heated to the glass transition temperature (Tg) of the alloy and cooled at a rate sufficiently rapid to prevent crystallization of the alloy and create an amorphous region. In some embodiments, cooling rates, such as at least $10^{3\circ}$ C./sec, alternatively at least $10^{4\circ}$ C./sec, or alternatively at least $10^{5\circ}$ C./sec, can be used to achieve an amorphous structure and prevent crystallization. An adjacent portion of the deposited metallic glass-forming alloy can be heated to the melting temperature $T_m$ of the alloy and cooled at a rate that allows the molten alloy to crystallize, thereby forming a selective crystallized region in the part.

Crystalline regions may be utilized to provide weakened, break-away regions that may be removed without machining, sawing, etc., e.g., to provide optional expansion port covers, tamper proof packing seals, removable assembly features, mechanical supports for machining processes, etc.

Figure 5A:
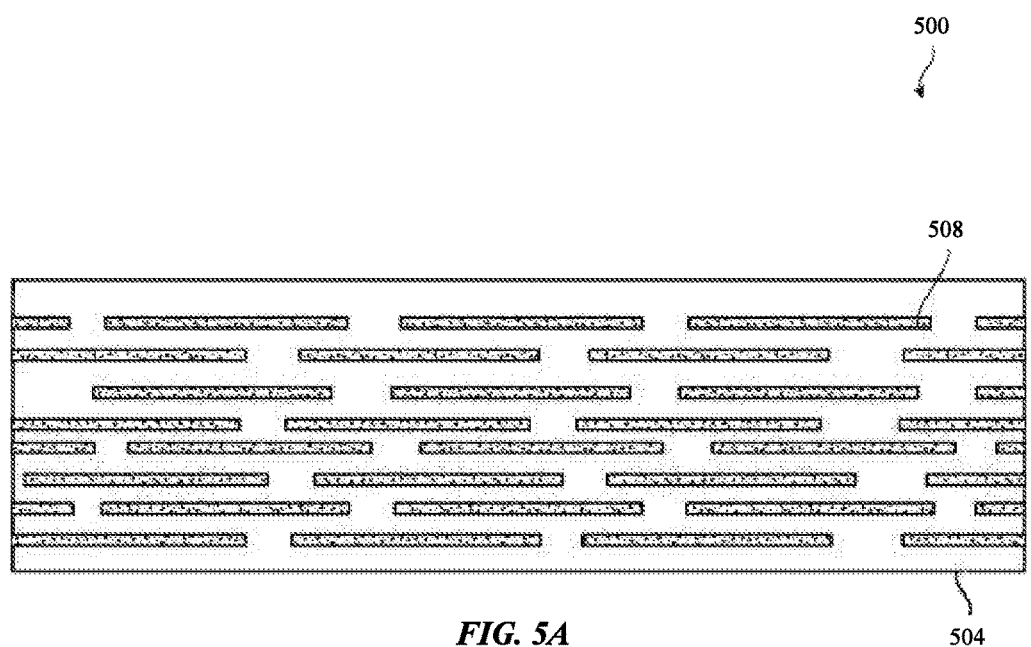
FIG. 5A depicts an exemplary composite part including material that is not metallic glass at selective positions within a metallic glass matrix.
Figure 5B:
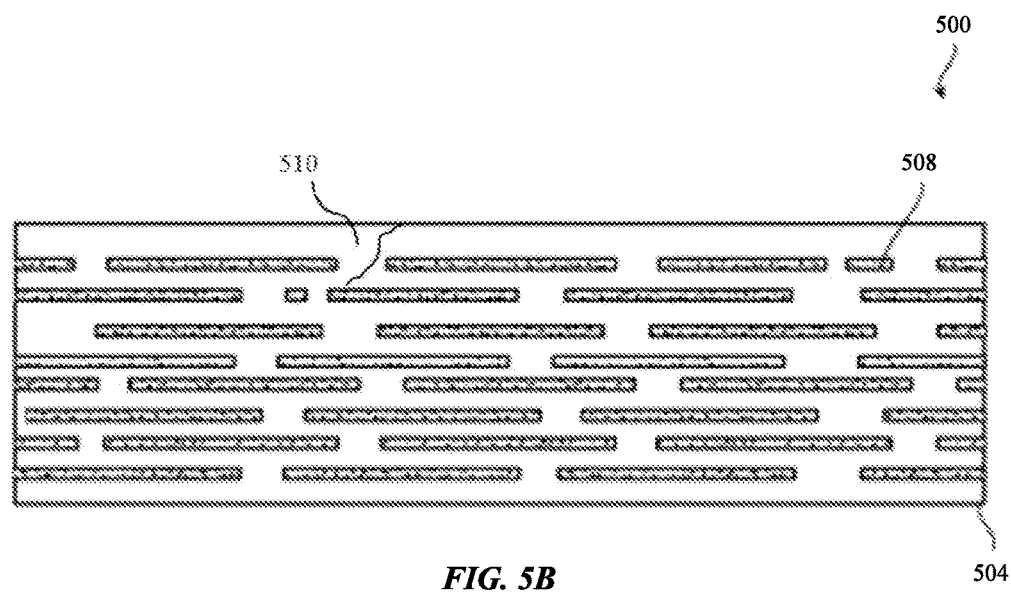
FIG. 5B depicts an exemplary composite part of FIG. 5A with crack deflection due to the selective metallic glass material dispersed within the metallic glass matrix.

In other aspects, non-metallic glass materials may be deposited and fused at selected positions, e.g., to provide flaws to assist in crack deflection and to reduce the effective thickness of mechanical elements to promote shear banding as a ductile failure mechanism. For instance, as shown in FIG. 5A, non-metallic glass-forming material (e.g. a powder, wire, sheet, or other suitable material) 508 can be selectively formed into the part including metallic glass 504. In certain embodiments, the selectively formed non-metallic glass materials 508 may assist in crack deflection, as shown in FIG. 5B. For example, as a crack 510 propagates through the metallic glass composite part 500, it can be deflected and/or stopped when it reaches the non-metallic glass material 508. In some embodiments, crack 510 can be a surface crack as shown. In other embodiments, the crack can be an internal crack within the composite part.

In some embodiments, the metallic glass composite parts, with non-metallic glass layers or regions selectively formed, can have a toughness greater than a glass part formed from only metallic glass layers. In some embodiments, the composite part can have a toughness of at least 5% greater than compared to a monolithic metallic glass part. In other embodiments, the toughness may be at least 10% greater, in still other embodiments, the toughness of the composite may be at least 20% greater compared to a monolithic metallic glass part.

Without intending to be limited by theory, amorphous metallic alloy "beams" may show limited plasticity in bending via the mechanism of shear banding. In accordance with certain aspects of the disclosure, this shear banding, in combination with beam thickness effect, may further improve the toughness of parts with selectively formed non-metallic glass materials designed into the part metallic glasses perform in an elastic/perfect plastic manner at a macroscopic scale. However, at a microscopic scale, deformation is highly localized in regions called shear bands. Shear band spacing increases with increasing plate size in bending. Further, shear bands cause local elastic unloading when they form, thereby reducing the likelihood of other shear bands forming in the vicinity. The unloaded zone size depends on the length of the shear band formed, which can be larger in thicker beams. By being spaced further apart, each shear band needs to slip (shear) further than it would if it was more closely spaced. The greater the slip displacement in the shear band, the greater the likelihood of cavitation and crack formation. Hence, thicker plates can sustain less plastic strain to fracture. In this way, in accordance with the present disclosure, selectively formed non-metallic glass materials provide selective shear banding to impart improved ductile properties and plasticity to parts of the disclosure.

In another aspect, the use of selectively formed shear banding to impart improved ductile properties and plasticity may be applied to other brittle materials in addition to metallic alloys, such as ceramics, glasses, steels, etc. For instance, non-metallic glass materials may be selectively integrated into brittle materials to provide selective shear banding, particularly in combination with beam thickness effect, to thereby deflect cracks and improve toughness.

Figure 6:
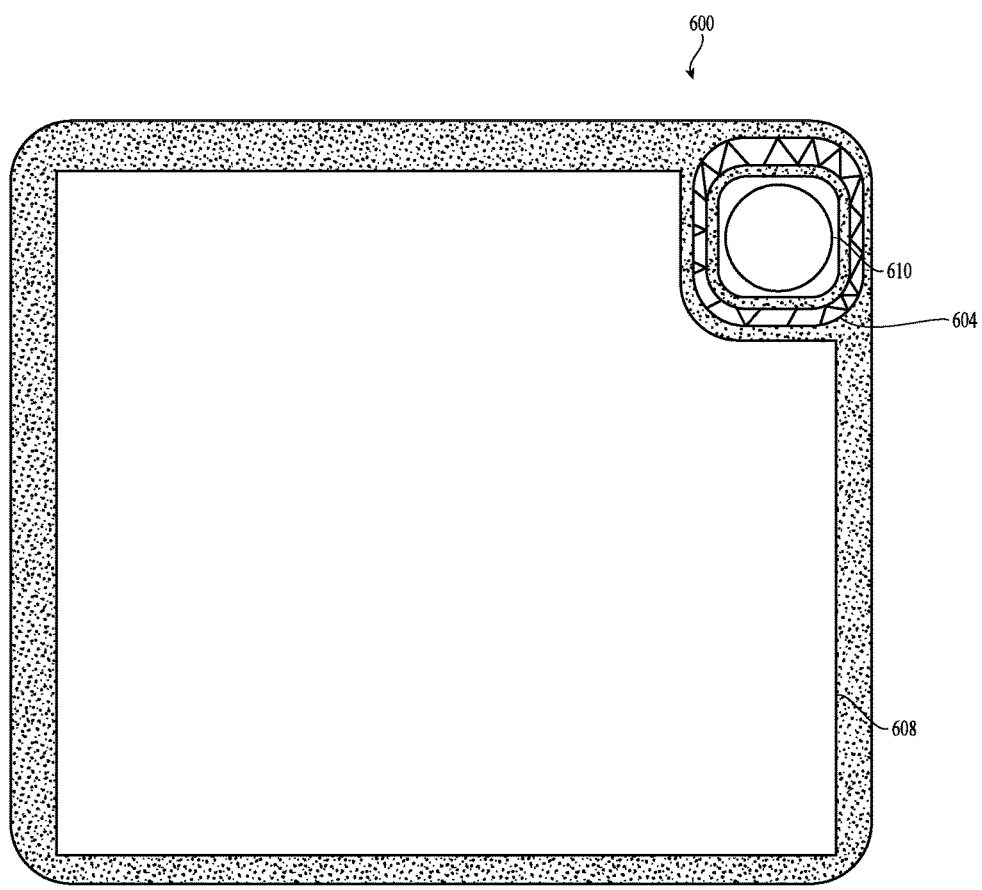
FIG. 6 depicts an exemplary part having a form-like structure incorporated into a housing.

In yet other aspects, the disclosure is directed to forming a foam-like, bellow or similar structure. The metallic glass-forming alloy or metallic glass material are deposited and fused to form a foam-like, bellow or similar structure 604 (as shown in FIG. 6), which is able to crumple under high stress to absorb energy under impact. In certain embodiments, when used in a foam-like structure, metallic glasses will have very good energy absorbance to mass and/or size ratio compared to incumbent materials. In accordance with the methods of the disclosure, parts may be constructed as foam-like structures, either forming the whole part, or a sub-section of a part. In other embodiments, a foam-like structure can also be selectively added to a part to reduce local stiffness, e.g. to reduce energy from impact loading in drop in particular components of the system. In some embodiments, the foam structure can be integrally formed with a housing to create a crumple zone that can absorb energy from an impact and provide protection to components within the housing.

In one aspect, a layer of a metallic glass-forming alloy is deposited and heated to create the foam. In some embodiments, the alloy can be deposited to form a lattice pattern. In some embodiments, the structure of the lattice can be an organized or ordered patterned. By way of example, without intending to be limiting, the foam can have a lattice structure that is a honeycomb or any other suitable shape. A metallic glass foam with an ordered lattice structure can be incorporated into or integrally formed in the housing to create a crumple zone that allow for collapse in controlled directions. For example, the lattice of the foam can have an ordered porosity (e.g. location, spacing, size, etc. of the voids is controlled and selected) to absorb the energy of an impact in a desired direction. In some embodiments, the lattice can be ordered to have unidirectional energy absorption and collapse, while in other embodiments, the lattice can be order to have controlled energy absorption and collapse in multiple directions. In other embodiments, the structure of the lattice can be random and/or lack order. The embodiment of FIG. 6 depicts part 600. The part includes housing 608 with a foam-like bellow 604 surrounding a low impact zone 610. Foam-like bellow 604 can be manufactured to be integrally formed onto housing 608 by depositing a layer of an amorphous alloy material. In other embodiments, the foam-like bellow can be manufactured and then incorporated into the housing. The amorphous alloy material is heated to a temperature above the glass transition of the alloy and cooled to form an amorphous metal foam part.

In some embodiments, the amorphous metal foam part can have a porosity of at least 10%. In other embodiments, the porosity (also referred to a void space) is at least 20%, in still other embodiments, the porosity is at least 25%.

Figure 7:
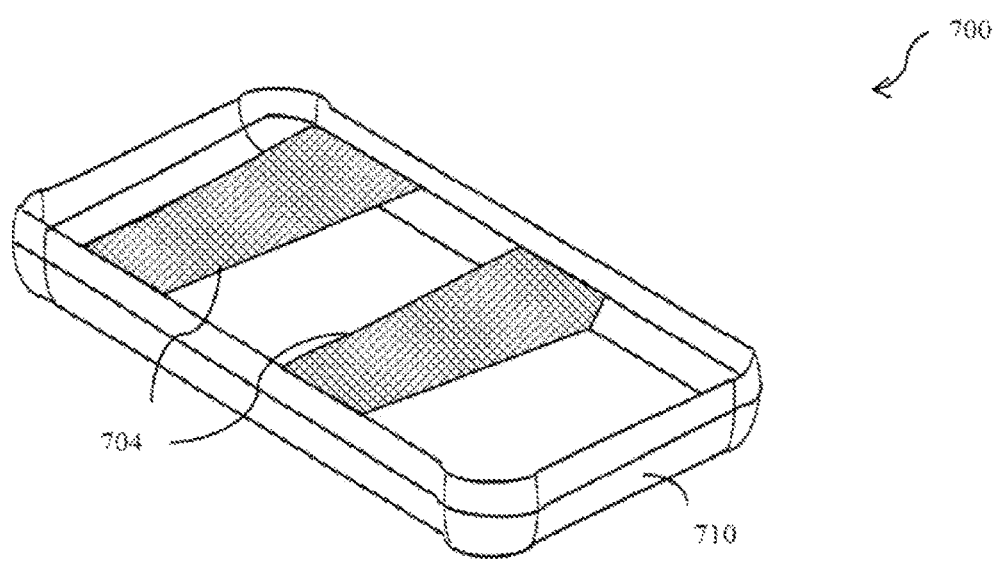
FIG. 7 depicts an exemplary housing for an portable electronic device having a metallic glass shell and internal foam structures.

In other embodiments, as depicted in FIG. 7, the metallic glass foam can be internal within a housing to reduce the density and/or weight of the housing. As depicted, housing 700 can comprise a shell 710 and internal metallic glass foam structures 704. The shell 710 can comprise a metal and be crystalline or amorphous. The internal metallic glass foam structures 704 can reduce the overall density and/or weight of the housing 700 as well as provide internal energy absorption. In some embodiments, the internal metallic glass foam structures 704 can create internal compartments for the various components that can be incorporated into the housing 700. In other embodiments, the housing can comprise a shell with an internal metallic glass foam core. In such embodiments, the overall geometry (i.e. shape) of the shell and foam core can be the same. For example if the shell of the housing is a rectangular-shape with rounded corners, the foam core can also be a rectangular-shape with rounded corners.

In embodiments herein, the existence of a supercooled liquid region in which the bulk metallic glass can exist as a high-viscous liquid allows for superplastic forming. Large plastic deformations can be obtained. The ability to undergo large plastic deformation in the supercooled liquid region is used for the forming and/or cutting process. As opposed to solids, the liquid bulk solidifying alloy deforms locally, which drastically lowers the required energy for cutting and forming. The ease of cutting and forming depends on the temperature of the alloy, the mold, and the cutting tool. As temperature becomes higher, viscosity becomes lower, and consequently cutting and forming are easier.

Embodiments herein can utilize a thermoplastic forming process with amorphous alloys carried out between Tg and Tx, for example. Herein, Tx and Tg are determined from standard DSC measurements at typical heating rates (e.g. 20° C./min) as the onset of crystallization temperature and the onset of glass transition temperature.

The parameters used in the printing methods described herein can depend on the metallic glass alloy. The amorphous alloy components (powder or sheets) can be at or below the critical casting thickness and the final part can have thickness that is thicker than the critical casting thickness. This technique can similarly be used to produce bulk parts using amorphous alloys that would not traditionally be considered as bulk glass-formers, since fully amorphous powder can be made with very small particle sizes. Moreover, the time and temperature of the heating and shaping operation is selected such that the elastic strain limit of the amorphous alloy could be substantially preserved to be not less than 1.0%, and preferably not being less than 1.5%. In the context of the embodiments herein, temperatures around glass transition mean the forming temperatures can be below glass transition, at or around glass transition, and above glass transition temperature, but preferably at temperatures below the crystallization temperature Tx. The cooling step is carried out at rates similar to the heating rates at the heating step, and preferably at rates greater than the heating rates at the heating step. The cooling step is also achieved preferably while the forming and shaping loads are still maintained.

Figure 8:
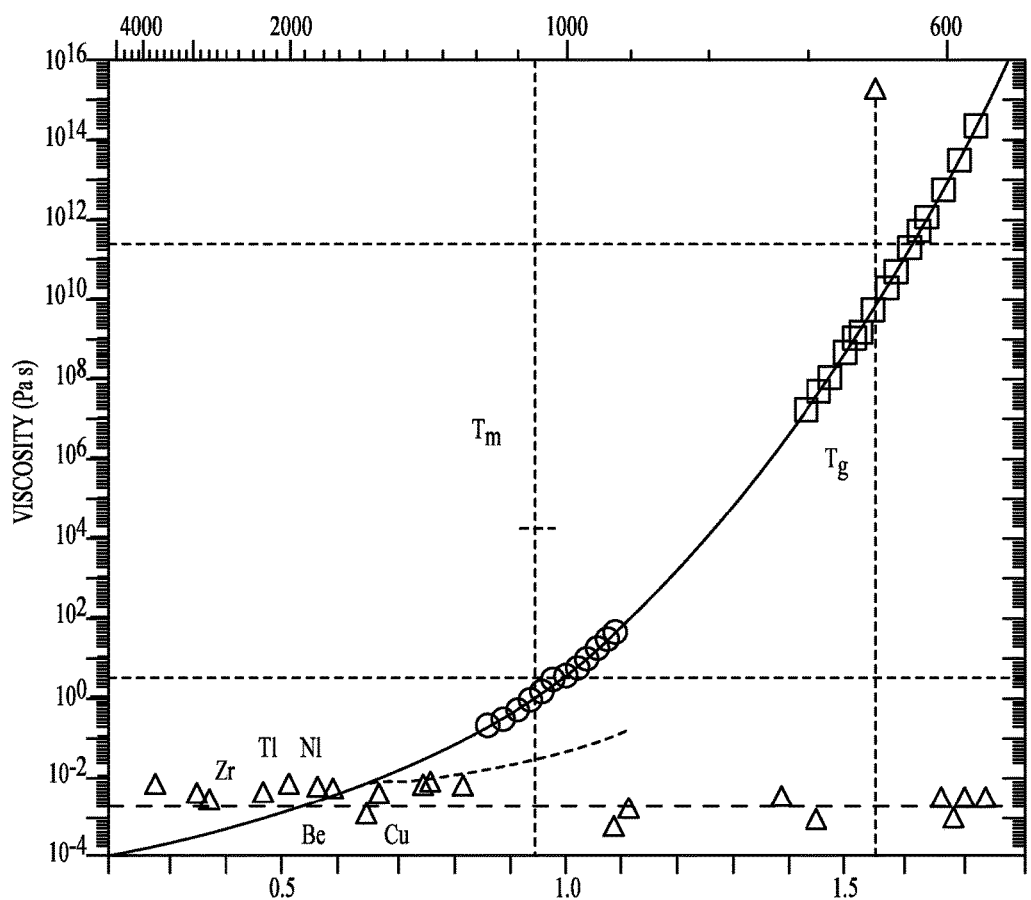
FIG. 8 depicts a temperature-viscosity diagram of an exemplary bulk solidifying amorphous alloy.

FIG. 8 shows a viscosity-temperature graph of an exemplary bulk solidifying amorphous alloy, from an exemplary series of Zr—Ti—Ni—Cu—Be alloys manufactured by Liquidmetal Technology. It should be noted that there is no clear liquid/solid transformation for a bulk solidifying amorphous metal during the formation of an amorphous solid. The molten alloy becomes more and more viscous with increasing undercooling until it approaches solid form around the glass transition temperature. Accordingly, the temperature of solidification front for bulk solidifying amorphous alloys can be around glass transition temperature, where the alloy will practically act as a solid for the purposes of pulling out the quenched amorphous sheet product.

Figure 9:
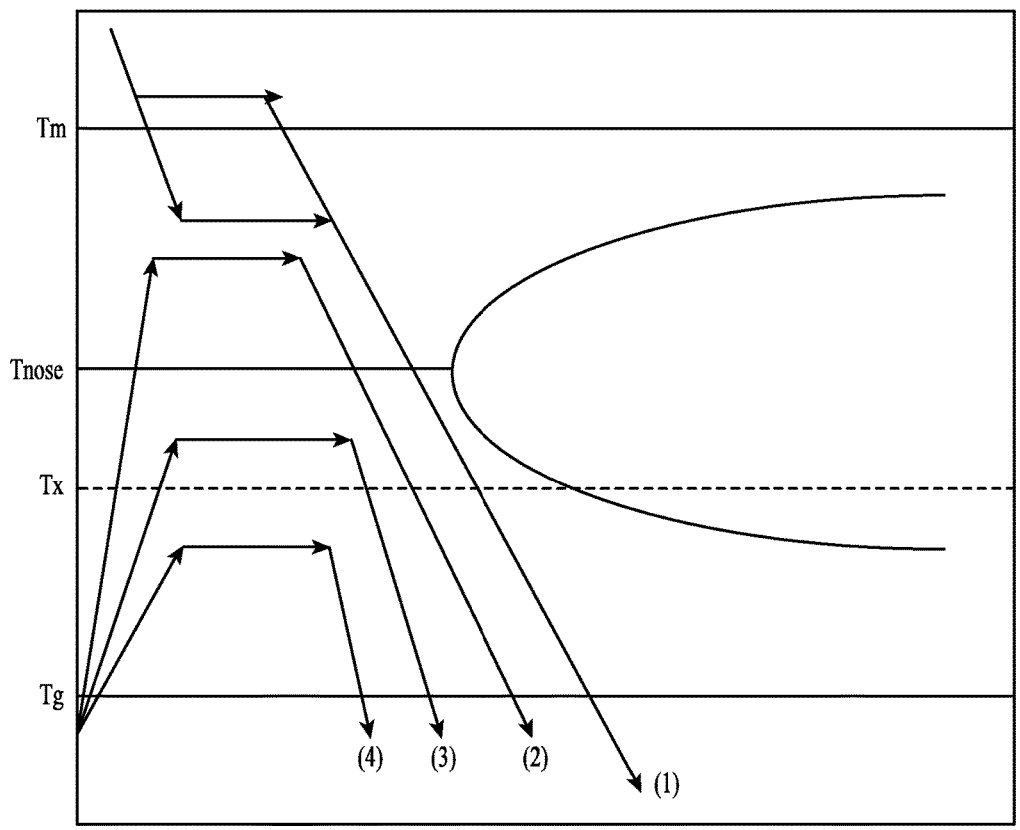
FIG. 9 depicts a schematic of a time-temperature-transformation (TTT) diagram for an exemplary bulk solidifying amorphous alloy.

FIG. 9 shows the time-temperature-transformation (TTT) cooling curve of an exemplary bulk solidifying amorphous alloy, or TTT diagram. Bulk-solidifying amorphous alloys do not experience a liquid/solid crystallization transformation upon cooling, as with conventional metals. Instead, the highly fluid, non-crystalline form of the metal found at high temperatures (near a "melting temperature" Tm) becomes more viscous as the temperature is reduced (near to the glass transition temperature Tg), eventually taking on the outward physical properties of a conventional solid.

Even though there is no liquid/crystallization transformation for a bulk solidifying amorphous alloy, a melting temperature Tm may be defined as the thermodynamic liquidus temperature of the corresponding crystalline phase. FIG. 9 shows processing methods of die casting from at or above Tm to below Tg without example time-temperature trajectory (1) hitting the TTT curve. Time-temperature trajectories (2), (3), and (4) depict processes at or below Tg being heated to temperatures below Tm. Under this regime, the viscosity of bulk-solidifying amorphous alloys at or above the melting temperature Tm could lie in the range of about 0.1 poise to about 10,000 poise, and even sometimes under 0.01 poise. A lower viscosity at the "melting temperature" would provide faster and complete filling of intricate portions of the shell/mold with a bulk solidifying amorphous alloy for forming the metallic glass parts. Furthermore, the cooling rate of the molten metal to form a metallic glass part has to be such that the time-temperature profile during cooling does not traverse through the nose-shaped region bounding the crystallized region in the TTT diagram of FIG. 9. In FIG. 9, Tnose (at the peak of crystallization region) is the critical crystallization temperature Tx where crystallization is most rapid and occurs in the shortest time scale.

The supercooled liquid region, the temperature region between Tg and Tx, is a manifestation of the stability against crystallization of bulk solidification alloys. In this temperature region the bulk solidifying alloy can exist as a high viscous liquid. The viscosity of the bulk solidifying alloy in the supercooled liquid region can vary between $10^{12}$ Pa s at the glass transition temperature down to $10^5$ Pa s at the crystallization temperature, the high temperature limit of the supercooled liquid region. Liquids with such viscosities can undergo substantial plastic strain under an applied pressure. The embodiments herein make use of the large plastic formability in the supercooled liquid region as a forming and separating method.

Technically, the nose-shaped curve shown in the TTT diagram describes Tx as a function of temperature and time. Thus, regardless of the trajectory that one takes while heating or cooling a metal alloy, when one hits the TTT curve, one has reached Tx. In FIG. 9, Tx is shown as a dashed line as Tx can vary from close to Tm to close to Tg.

The schematic TTT diagram of FIG. 9 shows processing methods of die casting from at or above Tm to below Tg without the time-temperature trajectory (shown as (1) as an example trajectory) hitting the TTT curve. During die casting, the forming takes place substantially simultaneously with fast cooling to avoid the trajectory hitting the TTT curve. The processing methods for superplastic forming (SPF) range from at or below Tg to below Tm without the time-temperature trajectory (shown as (2), (3) and (4) as example trajectories) hitting the TTT curve. In SPF, the metallic glass is reheated into the supercooled liquid region where the available processing window could be much larger than die casting, resulting in better controllability of the process. The SPF process does not require fast cooling to avoid crystallization during cooling. Also, as shown by example trajectories (2), (3) and (4), the SPF can be carried out with the highest temperature during SPF being above Tnose or below Tnose, up to about Tm. If one heats up a piece of amorphous alloy but manages to avoid hitting the TTT curve, you have heated "between Tg and Tm", but one would have not reached Tx.

Typical differential scanning calorimeter (DSC) heating curves of bulk-solidifying amorphous alloys taken at a heating rate of 20 C/min describe, for the most part, a particular trajectory across the TTT data where one would likely see a Tg at a certain temperature, a Tx when the DSC heating ramp crosses the TTT crystallization onset, and eventually melting peaks when the same trajectory crosses the temperature range for melting. If one heats a bulk-solidifying amorphous alloy at a rapid heating rate as shown by the ramp up portion of trajectories (2), (3) and (4) in FIG. 9, then one could avoid the TTT curve entirely, and the DSC data would show a glass transition but no Tx upon heating. Another way to think about it is trajectories (2), (3) and (4) can fall anywhere in temperature between the nose of the TTT curve (and even above it) and the Tg line, as long as it does not hit the crystallization curve. That just means that the horizontal plateau in trajectories might get much shorter as one increases the processing temperature.

Any metallic glass-forming alloy in the art may be used in the methods described herein. As used herein, the terms BMG, metallic glass, amorphous metal, and amorphous alloy are used interchangeably.

An amorphous or non-crystalline material is a material that lacks lattice periodicity, which is characteristic of a crystal. As used herein, an amorphous material includes glass which is an amorphous solid that softens and transforms into a liquid-like state upon heating through a glass transition. Generally, amorphous materials lack the long-range order characteristic of a crystal, though they can possess some short-range order at the atomic length scale due to the nature of chemical bonding. The distinction between amorphous solids and crystalline solids can be made based on lattice periodicity as determined by structural characterization techniques such as x-ray diffraction and transmission electron microscopy.

In one embodiment, an amorphous alloy composition can be homogeneous with respect to the amorphous phase. A substance that is uniform in composition is homogeneous. This is in contrast to a substance that is heterogeneous. A substance is homogeneous when a volume of the substance is divided in half and both halves have substantially the same composition. For example, a particulate suspension is homogeneous when a volume of the particulate suspension is divided in half and both halves have substantially the same volume of particles. However, it might be possible to see the individual particles under a microscope. Another example of a homogeneous substance is air, where different ingredients therein are equally suspended, though the particles, gases and liquids in air can be analyzed separately or separated from air. In various embodiments, the particle composition can vary, provided that the final amorphous material has the elemental composition of the amorphous alloy.

The methods described herein can be applicable to any type of suitable amorphous alloy. Similarly, the amorphous alloy described herein as a constituent of a composition or article can be of any type. As recognized by those of skill in the art, amorphous alloys may be selected based on a variety of potentially useful properties. In particular, amorphous alloys tend to be stronger than crystalline alloys of similar chemical composition.

The alloy can comprise multiple transition metal elements, such as at least two, at least three, at least four, or more, transitional metal elements. The alloy can also optionally comprise one or more nonmetal elements, such as one, at least two, at least three, at least four, or more, nonmetal elements. A transition metal element can be any of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium, and ununbium. In one embodiment, a metallic glass containing a transition metal element can have at least one of Sc, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. Depending on the application, any suitable transitional metal elements, or their combinations, can be used.

Depending on the application, any suitable nonmetal elements, or their combinations, can be used. A nonmetal element can be any element that is found in Groups 13-17 in the Periodic Table. For example, a nonmetal element can be any one of F, Cl, Br, I, At, O, S, Se, Te, Po, N, P, As, Sb, Bi, C, Si, Ge, Sn, Pb, and B. Occasionally, a nonmetal element can also refer to certain metalloids (e.g., B, Si, Ge, As, Sb, Te, and Po) in Groups 13-17. In one embodiment, the nonmetal elements can include B, Si, C, P, or combinations thereof. Accordingly, for example, the alloy can comprise a boride, a carbide, or both.

In some embodiments, the alloy composition described herein can be fully alloyed. The term fully alloyed used herein can account for minor variations within the error tolerance. For example, it can refer to at least 90% alloyed, such as at least 95% alloyed, such as at least 99% alloyed, such as at least 99.5% alloyed, or such as at least 99.9% alloyed. The percentage herein can refer to either volume percent or weight percentage, depending on the context. These percentages can be balanced by impurities, which can be in terms of composition or phases that are not a part of the alloy. The alloys can be homogeneous or heterogeneous, e.g., in composition, distribution of elements, amorphicity/crystallinity, etc.

The alloy can include any combination of the above elements in its chemical formula or chemical composition. The elements can be present at different weight or volume percentages. Alternatively, in one embodiment, the above-described percentages can be volume percentages, instead of weight percentages. Accordingly, an amorphous alloy can be zirconium-based, titanium-based, platinum-based, palladium-based, gold-based, silver-based, copper-based, iron-based, nickel-based, aluminum-based, molybdenum-based, and the like. The alloy can also be free of any of the aforementioned elements to suit a particular purpose. For example, in some embodiments, the alloy, or the composition including the alloy, can be substantially free of nickel, aluminum, titanium, beryllium, or combinations thereof. In one embodiment, the alloy or the composite is completely free of nickel, aluminum, titanium, beryllium, or combinations thereof.

Furthermore, the amorphous alloy can also be one of the exemplary compositions described in U.S. Patent Application Publication Nos. 2010/0300148 or 2013/0309121, the contents of which are herein incorporated by reference.

The amorphous alloys can also be ferrous alloys, such as (Fe, Ni, Co) based alloys. Examples of such compositions are disclosed in U.S. Pat. Nos. 6,325,868; 5,288,344; 5,368,659; 5,618,359; and 5,735,975, Inoue et al., Appl. Phys. Lett., Volume 71, p 464 (1997), Shen et al., *Mater. Trans., JIM*, Volume 42, p 2136 (2001), and Japanese Patent Application No. 200126277 (Pub. No. 2001303218 A). One exemplary composition is $Fe_{72}Al_5Ga_2P_{11}C_6B_4$. Another example is $Fe_{72}Al_7Zr_{10}Mo_5W_2B_{15}$. Another iron-based alloy system that can be used in the coating herein is disclosed in U.S. Patent Application Publication No. 2010/0084052, wherein the amorphous metal contains, for example, manganese (1 to 3 atomic %), yttrium (0.1 to 10 atomic %), and silicon (0.3 to 3.1 atomic %) in the range of composition given in parentheses; and that contains the following elements in the specified range of composition given in parentheses: chromium (15 to 20 atomic %), molybdenum (2 to 15 atomic %), tungsten (1 to 3 atomic %), boron (5 to 16 atomic %), carbon (3 to 16 atomic %), and the balance iron.

The afore described amorphous alloy systems can further include additional elements, such as additional transition metal elements, including Nb, Cr, V, and Co. The additional elements can be present at less than or equal to about 30 wt %, such as less than or equal to about 20 wt %, such as less than or equal to about 10 wt %, such as less than or equal to about 5 wt %. In one embodiment, the additional, optional element is at least one of cobalt, manganese, zirconium, tantalum, niobium, tungsten, yttrium, titanium, vanadium and hafnium to form carbides and further improve wear and corrosion resistance. Further optional elements may include phosphorous, germanium and arsenic, totaling up to about 2%, and preferably less than 1%, to reduce melting point. Otherwise incidental impurities should be less than about 2% and preferably 0.5%.

In some embodiments, a composition having an amorphous alloy can include a small amount of impurities. The impurity elements can be intentionally added to modify the properties of the composition, such as improving the mechanical properties (e.g., hardness, strength, fracture mechanism, etc.) and/or improving the corrosion resistance. Alternatively, the impurities can be present as inevitable, incidental impurities, such as those obtained as a byproduct of processing and manufacturing. The impurities can be less than or equal to about 10 wt %, such as about 5 wt %, such as about 2 wt %, such as about 1 wt %, such as about 0.5 wt %, such as about 0.1 wt %. In some embodiments, these percentages can be volume percentages instead of weight percentages. In one embodiment, the alloy sample/composition consists essentially of the amorphous alloy (with only a small incidental amount of impurities). In another embodiment, the composition includes the amorphous alloy (with no observable trace of impurities).

In other embodiments, amorphous alloys, for example, of boron, silicon, phosphorus, and other glass-formers with magnetic metals (iron, cobalt, nickel) may be magnetic, with low coercivity and high electrical resistance. The high resistance leads to low losses by eddy currents when subjected to alternating magnetic fields, a property useful, for example, as transformer magnetic cores.

In further embodiments, mix functional elements and alloys can be added to the amorphous metal substrate by the methods disclosed herein. Metallic glass composites of materials that were not able to be formed previously can be prepared in this manner. In some variations, metallic glass powder can be embedded with another material powder that imparts specific properties. For example, magnetic alloys and particles can be added to metallic glass powder, such that a non-magnetic metallic glass alloy can be modified to exhibit magnetic properties. Likewise, particles of a ductile material can be added to stop crack tip propagation and improve the toughness of the composite. Heating methods disclosed herein can be used to make such materials by keeping the melted/heat affected zone localized and quiescent (e.g. by reducing mixing of elements between neighboring regions, imparting compositional change). In various aspects, different amounts of heat to each powder type to tune temperature exposure of each, for example by using a CCD to identify each powder type, or by the properties of the powder (e.g. reflectivity under particular wavelengths, heat capacity). In another variation, metallic glass and other material powders can be added separately during each layering step.

The methods herein can be valuable in the fabrication of electronic devices using a metallic glass. An electronic device herein can refer to any electronic device known in the art. For example, it can be a telephone, such as a cell phone, a land-line phone, or any communication device, such as a smart phone, including, for example an iPhone®, or an electronic email sending/receiving device. It can be a part of a display, such as a digital display, a TV monitor, an electronic-book reader, a portable web-browser (e.g., iPad®), watch, or a computer monitor. It can also be an entertainment device, including a portable DVD player, conventional DVD player, Blue-Ray disk player, video game console, music player, such as a portable music player (e.g., iPod®), etc. It can also be a part of a device that provides control, such as controlling the streaming of images, videos, or sounds (e.g., Apple TV®), or it can be a remote control for an electronic device. It can be a part of a computer or its accessories, such as a hard drive tower housing or casing, laptop housing, laptop keyboard, laptop track pad, desktop keyboard, mouse, or speaker. The article can also be applied to a device such as a watch or a clock.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

All publications, patents, and patent applications cited in this Specification are hereby incorporated by reference in their entirety.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

The invention claimed is:

1. A method of forming a metallic glass composite part with improved toughness comprising:
depositing a layer of non-metallic glass material to one or more portions of a metallic glass layer formed of a metallic glass-forming alloy comprising at least one of a powder, a wire, or a sheet; and
fusing the layer of non-metallic glass material to the metallic glass layer to form a shear band of non-metallic glass material embedded in the metallic glass layer of the metallic glass composite part.

2. The method of claim 1 where the toughness of the metallic glass composite part is 5% greater than a metallic glass part formed of the metallic glass-forming alloy.

3. The method of claim 1, wherein the non-metallic glass material is selected from a group consisting of crystalline material, plastic, ceramic, semiconductors, and Kevlar fibers.

4. The method of claim 1 where the metallic glass-forming alloy is a powder.

5. The method of claim 4 where the metallic glass-forming alloy is a homogenous atomized powder.

6. The method of claim 1 where the metallic glass-forming alloy is a wire.

7. The method of claim 1, further comprising:
depositing a layer formed of the metallic glass-forming alloy over the non-metallic glass material and at least a portion of the metallic glass layer; and
fusing the layer of the metallic glass-forming alloy to the non-metallic glass material and the at least a portion of the metallic glass layer.

8. The method of claim 1, wherein the non-metallic glass material comprises at least one of a powder, a wire, or a sheet.

9. A method of forming an amorphous metal foam part comprising:
depositing a layer of a metallic glass-forming alloy onto a housing;
heating the layer of metallic glass-forming alloy to a temperature above the glass transition of the alloy and cooling to form an integrally formed amorphous metal foam part onto the housing; and
the amorphous metal foam part having at least 10% void space by volume,
wherein the integrally formed amorphous metal foam part forms internal structures of the housing, wherein the housing comprises a shell, and the amorphous metal foam forms a core that is surrounded by the shell.

10. The method of claim 9 where the metallic glass-forming alloy is heated to above the glass transition temperature in a time of less than 5 seconds.

11. The method of claim 9 wherein the layer of metallic glass-forming alloy is selectively deposited such that the amorphous metal foam part has an ordered lattice structure.

12. The method of claim 11 wherein the ordered lattice structure comprises a honeycomb.

13. The method of claim 9 where the metallic glass-forming alloy is selectively deposited to create crumple zone with an unidirectional collapse.

14. The method of claim 9 where the metallic glass-forming alloy comprises a powder.

15. The method of claim 14 where the powder is a homogenous atomized powder.

16. The method of claim 9 where the metallic glass-forming alloy comprises a wire.

* * * * *